F. J. H. RUSTIGE.
AUTOMATIC INTERMITTENT LIGHT APPARATUS.
APPLICATION FILED FEB. 21, 1914.

1,140,617.

Patented May 25, 1915.

WITNESSES:
John C. Sanders
Albert F. Heuman

INVENTOR
Frans Johan Henrik Rustige
BY Wallace White
ATT'Y

UNITED STATES PATENT OFFICE.

FRANS JOHAN HENRIK RUSTIGE, OF STOCKHOLM, SWEDEN.

AUTOMATIC INTERMITTENT-LIGHT APPARATUS.

1,140,617.                     Specification of Letters Patent.     Patented May 25, 1915.

Application filed February 21, 1914. Serial No. 820,163.

*To all whom it may concern:*

Be it known that I, FRANS JOHAN HENRIK RUSTIGE, a subject of the King of Sweden, residing at Lilla Essingen, Stockholm, Sweden, have invented new and useful Improvements in Automatic Intermittent-Light Apparatus, of which the following is a specification.

In automatic intermittent light apparatus it is of great importance, that the periods of light and darkness should be controllable as desired without it being necessary to take the apparatus into pieces.

The present invention relates to a device which enables such a controlling to be made by a member available from outside, for instance a screw.

A form of the invention is illustrated in the accompanying drawing, where—

Figure 1:
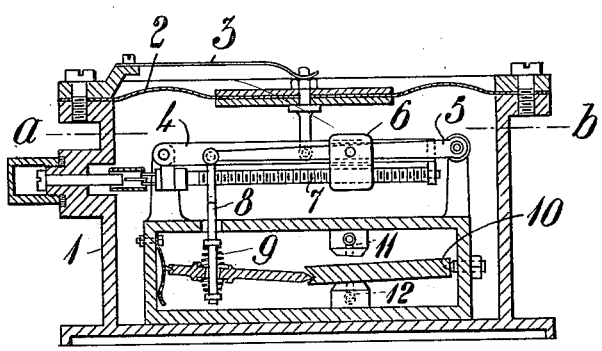
Figure 2:
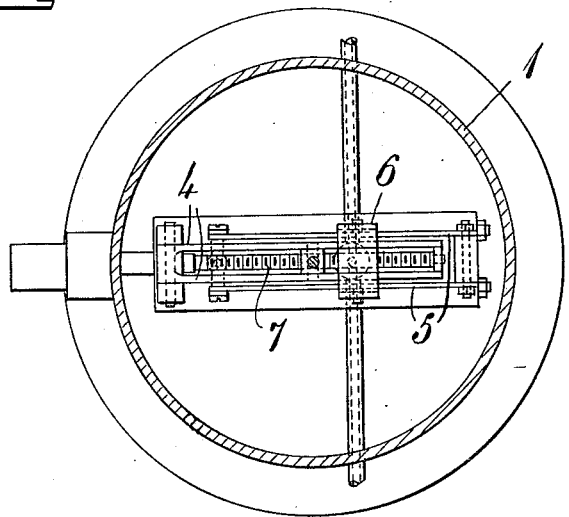
Figure 3:
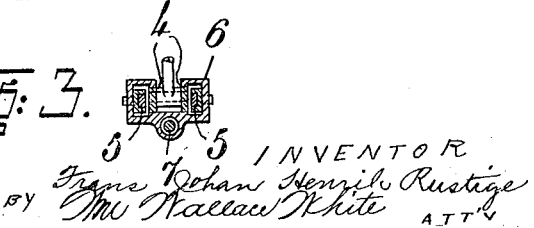

Figure 1 shows an intermittent light apparatus embodying the invention in a central vertical section, Fig. 2 the same in a horizontal section on the line *a—b* in Fig. 1 and Fig. 3 a detail section taken transversely through the adjustable link.

The casing 1 of the apparatus is divided by the movable wall or diaphragm 2 which is acted upon in one direction by a spring 3 and in the other by the varying gas pressure, and which in its turn actuates a valve plate 10 by means of a reversing mechanism 8, 9 so as to close alternately an inlet 11 and an outlet 12 for the gas and thereby periodically cutting off the current of gas. According to the present invention there is now inserted between the diaphragm 2 and the reversing mechanism 8, 9 a mechanism consisting of two levers 4, 5, one 4 of which is connected to the diaphragm while the other 5 is connected to the link 8 belonging to the reversing mechanism, and of a link 6 connecting said levers and reciprocatable along them. By moving said link which is shown in a cross section in Fig. 3 in either direction by means of a screw 7 rotatable from outside (after removal of a small cover) and engaging a nut secured to the link, the leverage of the two levers may obviously be increased or reduced, which causes a reversing of the valve 10 after smaller or greater movements of the diaphragm 2. This, further, under equal conditions otherwise corresponds to a smaller or greater admitted gas quantity for each stroke and a greater or smaller speed of reciprocation.

Having now particularly described the nature of my invention and the manner of its operation, what I claim is:

1. In automatic intermittent light apparatus, a casing, a movable wall therein, said casing having a chamber provided with an inlet and an outlet, a valve controlling the said inlet and outlet of the chamber, two levers connecting said movable wall to said valve, and a link connecting said levers and displaceable along them so as to control the operative lengths thereof.

2. In automatic intermittent light apparatus, a casing, a movable wall therein, said casing having a chamber provided with an inlet and an outlet, a valve controlling the inlet and outlet of the chamber, two levers connecting said movable wall to said valve, a link connecting said levers and displaceable along them so as to control the operative lengths thereof, and a screw accessible from the exterior of the apparatus acting to displace the link.

In testimony whereof I have signed my name to this specification in the presence of two subscribing witnesses.

FRANS JOHAN HENRIK RUSTIGE.

Witnesses:
 BIRGER NORDFELDT,
 A. SIMON.

Copies of this patent may be obtained for five cents each, by addressing the "Commissioner of Patents, Washington, D. C."